US009259697B2

(12) United States Patent
Ospina Martinez et al.

(10) Patent No.: US 9,259,697 B2
(45) Date of Patent: Feb. 16, 2016

(54) PROCESS FOR MANUFACTURING A FERMENTED MILK

(75) Inventors: Ana Ospina Martinez, Madrid (ES); Jean-Pierre Caron, Barcelona (ES); Thierry Di Tecco, Madrid (ES); Noémie Genovesi, Gif sur Yvette (FR); Sébastien Biloe, Massy (FR)

(73) Assignee: Compagnie Gervais Danone, Paris (FR)

( * ) Notice: Subject to any disclaimer, the term of this patent is extended or adjusted under 35 U.S.C. 154(b) by 612 days.

(21) Appl. No.: 12/279,479

(22) PCT Filed: Feb. 22, 2006

(86) PCT No.: PCT/EP2006/002197
§ 371 (c)(1),
(2), (4) Date: Feb. 3, 2009

(87) PCT Pub. No.: WO2007/095969
PCT Pub. Date: Aug. 30, 2007

(65) Prior Publication Data
US 2009/0252831 A1 Oct. 8, 2009

(51) Int. Cl.
*A23C 9/12* (2006.01)
*B01F 7/00* (2006.01)
*A23C 19/06* (2006.01)

(52) U.S. Cl.
CPC ........... *B01F 7/00766* (2013.01); *A23C 9/1223* (2013.01); *A23C 19/06* (2013.01); *B01F 2215/045* (2013.01); *B01F 2215/0431* (2013.01);

(Continued)

(58) Field of Classification Search
CPC ............... B01F 7/00766; B01F 2215/0431; B01F 2215/045; B01F 2215/0481; B01F 2215/0495; A23C 9/1223; A23C 19/06
USPC ......... 426/519, 34, 656, 36, 42–43, 582–583, 426/491, 504; 366/149, 302–306; 117/200
See application file for complete search history.

(56) References Cited

U.S. PATENT DOCUMENTS 3,285,331 A * 11/1966 Bratland ................... 165/109.1
5,240,724 A     8/1993 Otto et al. .................... 426/231
5,372,825 A * 12/1994 Campbell et al. ............. 426/42

(Continued)

FOREIGN PATENT DOCUMENTS

| CA | 2167020 | 7/1997 | ............. A23C 9/123 |
| DE | 3519854 | 2/1987 | ............... B01F 5/06 |

(Continued)

OTHER PUBLICATIONS

Labbafi et al. (2005), Impact de la technologie et des conditions du foisonnement sur l'élaboration de mousses latières de type <<topping>>, Science des Ailments: 25: 381-395 with English Abstract.

*Primary Examiner* — Steven Leff
(74) *Attorney, Agent, or Firm* — Morgan, Lewis & Bockius LLP

(57) ABSTRACT

The invention relates to a manufacturing process of stirred or drinking fermented milk or fresh cheese comprising a smoothing step after fermentation wherein said smoothing step is performed by a ring-shaped rotor-stator mixer, each ring of the rotor and the stator being provided with radial slots having a given width, and adjusting the rotational speed to adjust the peripheral velocity.

22 Claims, 1 Drawing Sheet

(52) U.S. Cl.
CPC . *B01F 2215/0481* (2013.01); *B01F 2215/0495* (2013.01)

(56) References Cited

U.S. PATENT DOCUMENTS

| | | | |
|---|---|---|---|
| 6,689,402 B1 * | 2/2004 | Nauth et al. | 426/36 |
| 6,759,067 B1 * | 7/2004 | Ogasawara et al. | 426/34 |
| 2002/0012719 A1 * | 1/2002 | Nadland | 426/34 |
| 2004/0187770 A1 * | 9/2004 | Calabrese et al. | 117/200 |

FOREIGN PATENT DOCUMENTS

| | | | |
|---|---|---|---|
| EP | 0204294 | 9/1990 | B01F 5/06 |
| EP | 0499041 | 8/1992 | A23C 10/08 |
| GB | 342098 | 1/1931 | |
| WO | WO 93/10665 | 6/1993 | A23C 15/16 |
| WO | WO 99/37164 | 7/1999 | A23G 9/02 |

* cited by examiner

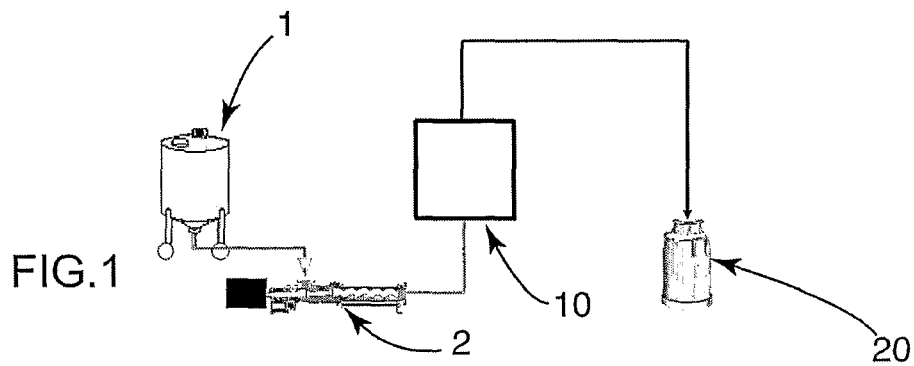
FIG.1
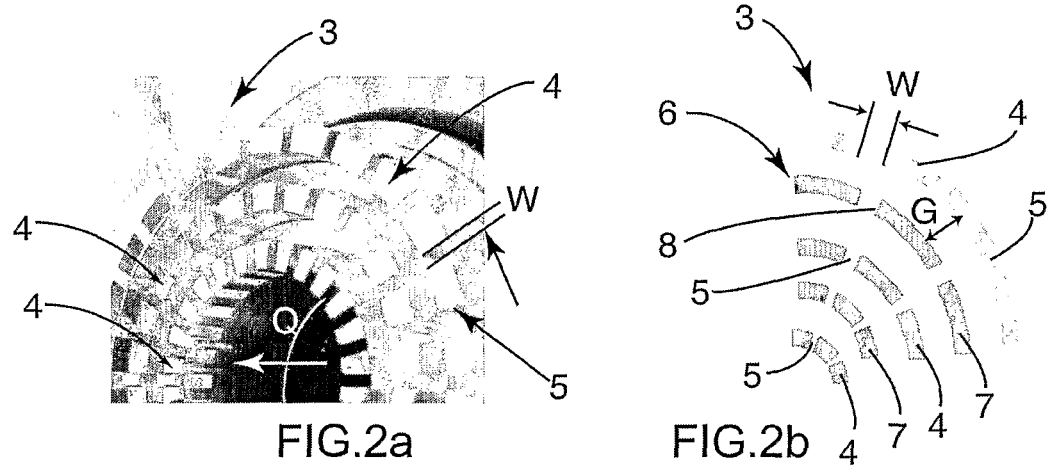
FIG.2a
FIG.2b
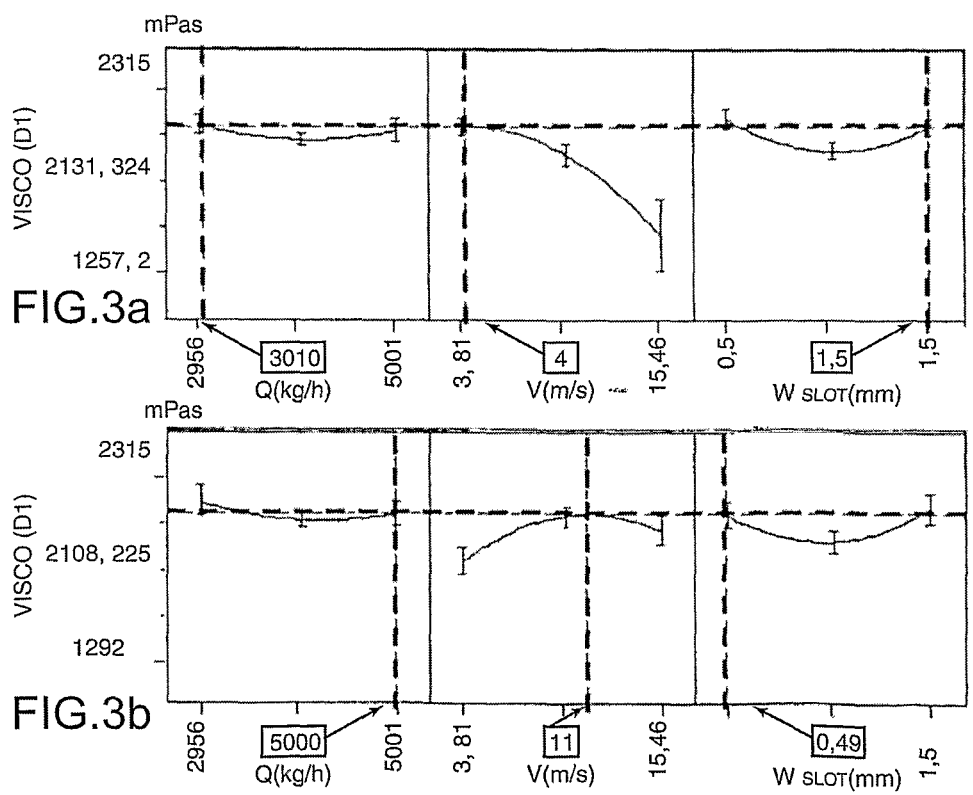
FIG.3a
FIG.3b

PROCESS FOR MANUFACTURING A FERMENTED MILK

RELATED APPLICATIONS

The present application is a U.S. National Phase application of International Application PCT/EP2006/002197, filed Feb. 22, 2006, which is incorporated by reference in its entirety.

The invention relates to a process for the manufacturing of a fermented milk, namely a stirred or drinking fermented milk or fresh cheese, comprising a smoothing step after fermentation in a tank to generate an homogeneous and smooth texture.

A stirred fermented milk, is incubated in a tank and the final coagulum is broken by stirring prior to cooling and packing. The texture is somewhat like a thick cream and is less firm than that of a set yoghurt (which is incubated and cooled in the final package and is characterized by a firm jelly like structure). A drinking fermented milk is very similar to a stirred fermented milk, but its viscosity is much lower.

The stirred operation after fermentation is a key process in the manufacturing of stirred or drinking fermented milk, such as a stirred yoghurt or a drinking yoghurt. This unit operation is usually performed by using filters or valves.

More particularly, the process also relates to a fermented milk that has been submitted to a step of high pressure homogenization before fermentation.

The first known solution for the stirring operation after fermentation is the continuous agitation of the fermented mass in the tank during the transfer operation to cooler. But the standard agitation in a tank leads to a high viscosity loss.

The second solution, namely using a static filter has been a better alternative to smooth the product, but the new ingredient development, some texture innovation, the complexity of current lines for a big mix of different products and the viscosity target variation, require a new more sensible system for this operation.

On the other hand, the stirred yoghurt manufacturing with a static filter is impossible to do without changing filter during production because of the plugging.

A hand cleaning of the filter is necessary to achieve the total cleanliness with hygiene risks for the products. It also implies interrupting the production during the cleaning operation.

The present invention relates to a process for the manufacture of stirred or drinking fermented milk or a fresh cheese comprising after a fermentation step a smoothing step wherein said smoothing step is performed by a rotor stator mixer comprising a ring shaped rotor and a ring shaped stator, each ring of the rotor and of the stator being provided with radial slots having a given width, comprising adjusting the rotational speed of the rotor to adjust the peripheral velocity.

The stator head may have three rings and the rotor head three rings.

The radial gap between rings of the stator and of the rotor may be between 0.5 mm and 2 mm.

The slot width may be between 0.3 mm and 2 mm, and more particularly between 0.5 mm and 1.8 mm The rotor may be operated so that the peripheral velocity is not higher than 16 m/s for a stirred fermented milk, more particularly between 3.5 m/s and 16 m/s or between 5.5 m/s and 11.4 m/s (depending on the line flow rate and the machine model).

For a stirred fermented milk (e.g. stirred yoghurt) or a fresh cheese, with a target viscosity between 300 mPas and 3700 mPas, the peripheral speed is between 3.5 m/s and 16 m/s.

For a flow rate between 150 l/h and 20,000 l/h, the peripheral speed is preferably between 3.8 m/s and 15.7 m/s.

For a flow rate between 20,000 l/h and 60,000 l/h, the peripheral speed is preferably between 5.5 m/s and 11.4 m/s.

For a drinking fermented milk (e.g. a drinking yoghurt) with a target viscosity between 30 mPas and 300 mPas, the peripheral velocity is between 22 m/s and 30 m/s for a flow rate between 150 l/h and 20,000 l/h and preferably between 25 and 30 m/s for a flow rate between 20,000 l/h and 60,000 l/h. With such a low viscosity, these speeds do not bring a high shear rate to the product, hence minimizing the viscosity loss.

The fermented milk may be of the fat free type and the process comprises adjusting the peripheral velocity.

The fermented milk may be of a medium fat formula comprising a fat content between 3% and 5% in weight and the process comprises adjusting the peripheral velocity.

The fermented milk may have a fat free formula with an addition of starch between 1.5% and 3% in weight and the process comprises adjusting the peripheral velocity, the slot width being less than 1 mm, or, with a slot width between 0.3 mm and 0.8 mm, adjusting the peripheral velocity up to 11 m/s.

The fermented milk may have a high-fat content between 7.5% and 10% in weight.

The fermented milk may be a fresh cheese and the process comprises adjusting the peripheral velocity, the slot width being between 1 mm and 1.5 mm.

The invention also relates to a smoothing rotor-stator mixer for performing the process defined above, comprising a ring shaped rotor head and a ring shaped stator, each ring of the rotor and of the stator being provided with radial slots having a given width.

The stator may have three rings and the rotor head may have three rings.

The slot width may be between 0.3 mm and 2 mm and more particularly between 0.5 mm and 1.5 mm.

A radial gap between the rings of the stator and of the rotor may be between 0.5 mm and 2 mm.

The rotational speed of the rotor may be adjustable so that the peripheral velocity is not higher than 16 m/s, and more particularly between 3.5 m/s and 16 m/s.

In the appended drawing,

FIG. 1 illustrates the smoothing step according to the invention,

FIGS. 2a and 2b show the internal structure of the mixer and

FIGS. 3a and 3b illustrate a test for a formula that is fat free with starch.

It is worth mentioning that in prior art, there was a great variety of machines for mixing or dispersing the ingredients in the first stage of the process (ingredient mixing).

The current fields of application of these machines are homogeneous mixing, suspending and dissolving powders, dispersing applications, emulsifying.

No one of these machines may be used for the smoothing of yoghurts after fermentation, since a direct implementation of such an equipment would produce a high or very high viscosity loss that would not be acceptable.

According to the invention, it has been found that a machine of the rotor-starter type having ring shaped stator and rotor each having radial slots could be adapted to achieve the smoothing operation which minimizes the loss of texture, i.e. the loss of viscosity.

State of the art machine of this type always provide high shear rates because on the one hand of the dimensioning of the stator and rotor and on the other hand of their fixed frequency of rotation (50 Hz or 100 Hz, i.e. 3000 or 6000 rpm), corresponding to a range of velocities of 18-25 m/s. This range of velocities is not suitable for the process according to this invention for products such as a stirred or drinking fermented milk, or a fresh cheese.

The process according to the invention concerns a fermented milk as defined by the Codex Alimentarius Standard for Fermented Milks (CODEX STAN 243-2003) or a fresh cheese. The preferred product is a stirred or drinking yoghurt (the meaning of the word "yoghurt" being the broadest meaning we could have—i.e. the U.S. meaning). Yoghurt according to the invention is including product containing some bacterial strains like *Lactobacillus* spp. *paracasei, Bifidobacterium aninalis* subsp *lactis, Lactococcus* spp. *lactis, Lactobacillus* spp. *plantarum* . . . and product containing vegetable oils like phytosterols (and sterols esters) or PUFA.

Cheese according to the invention is the unripened semi-solid product in which the whey protein/casein ratio does not exceed that of milk, obtained by:

a) coagulation wholly or partly the following raw materials: milk, skimmed milk, partly skimmed milk, cream, whey cream, or buttermilk, or any combination of these materials, through the action of rennet or other suitable coagulating enzymes, and by partially draining the whey resulting from such coagulation; and/or b) processing techniques involving coagulation of milk and/or materials obtained from milk which give an end-product with similar physical, chemical and organoleptic characteristics as the product defined under a).

Fresh cheese may be obtained by adding rennet to a milk mass, fermenting, and draining by centrifugation to obtain an homogeneous paste which may be smoothed according to the present invention.

The product used in the experiments is a yoghurt-based fermented white mass, manufactured with different fat and protein content in the range of 0-10% Fat Content FC and 3-5.5% Protein Content PC (in weight), and 1.5-3% starch content for a formula including starch.

The products have been classified in four different categories:

Fat Free Formula: FFF (less than 0.5% FC)
Medium Fat Formula: MFF (between 3% and 5% FC)
FF with starch & gelatine: FFS Formula (less than 0.5% FC with 1.5-3% starch in weight).
High-Fat Content Formula: HFC (9.5% FC) for yoghurt or for fresh cheese.

The corresponding specifications and components are gathered in Table 1.

TABLE 1

Formula specifications for the white masses

| White masses | Fat (%) | Protein (%) | Dry weight (%) |
|---|---|---|---|
| Range | 0-10 | 3-5.5 | |
| FFF | 0.05 | 4.90 | 13.70 |
| MFF | 4.00 | 4.40 | 20.85 |
| FFS | 0.07 | 4.02 | 10.97 |
| HFC | 9.6 | 4.35 | |

For the FFS formula, tested compositions comprise 2.2% starch and 0.2% gelatine in weight.

Moreover, experiments has been made with white mass used for making fresh cheeses with a fat content between 3.4 and 7.1% and a protein content between 4.9 and 5.4%.

FIG. 1 illustrates the smoothing stage according to the invention. A pump 2 is placed downwards from a fermentation tank 1. The in-line mixer 10 is placed after the pump. The product is recovered in a tank 20 at the output of the in-line mixer 10.

For the experiment design, the fermented product is pumped, and then smoothed in the pump 2 at about 38-39° C. (depending on the culture), at the pH target of 4.65.

Sampling is done on the product at 38-39° C. after the smoothing operation. All different products are maintained at fermentation temperature until batch experiments are finished. Then, the fermented milk is packaged and cooled into a cooling cell down to 10° C.

The samples are stored at 10° C. prior to analysis.

FIG. 2a shows the internal structure of the stator head of the mixer 10 and FIG. 2b shows the assembly of a rotor-stator head of the mixer 10. The stator head 3 is comprised of three rings 4 each of which is provided with radial slots 5. The rotor head 6 is comprised of three rings 7 each of which is provided with radial slots 8. Radial slots 5 and 8 have a width Ws and the stator-rotor gap between the stator rings 4 and the rotor rings 7 is designated by G.

FIGS. 3a and 3b illustrate the impact of peripheral velocity (V) on FFS Formula viscosity at D1 for a ring slot width of 1.5 mm (a) and 0.5 mm (b) respectively, The middle curve of FIG. 3a shows the impact of the peripheral velocity on viscosity at D1 for a low radial velocity (low flow rate Q=3010 kg/h & high slot width=1.5 mm): the increase in peripheral velocity induces a viscosity loss.

The middle curve of FIG. 3b shows the peripheral velocity impact on viscosity at D1 for a high radial velocity (high flow rate Q=5000 kg/h & low slot width of 0.5 mm): the increase in peripheral velocity allows to raise the texture until 11 m/s (maximum in 2108 at 11 m/s).

In order to obtain the same viscosity values with different parameters of flow rate (Q) and ring slot width (W), it is necessary to adjust the peripheral velocity.

The resident time in mixer 10 is close to a few seconds. The two main components of the velocity field are the peripheral velocity (flow between rotor-stator gap) and the radial component (flow along the ring slots).

The peripheral velocity depends on the rotational speed of the rotor head. On the other hand, the radial velocity depends on both the flow rate and on the geometrical parameters of the rotor-stator design (slot width).

The object of the smoothing operation according to the invention is to obtain a smooth and possible grainless texture with a particular target viscosity.

By adapting the geometry and the rotational speed of a rotor-stator mixer, it is possible to obtain a dynamic smoothing ensuring a slow stirring of a stirred fermented milk, e.g. a yoghurt.

The adjustment of the peripheral speed allows to adjust the viscosity of the product and/or to monitor the viscosity in real time during production.

A fermented milk according to the invention may be submitted to a mixing step (very slow stirring) in the fermentation tank just sufficient to avoid the building of a firm jelly-like structure like that of a conventional set yoghurt. Then the process according to the invention may be considered as involving a double stirring (very slow stirring in the tank, slow stirring or smoothing downstream of the tank).

Conversely, prior art filters are neither flexible nor suitable for high-texture white masses and lead to a rapid filter plugging and the obtained fermented milk still has grains. Smoothing with a disk filter is not suitable to achieve a smooth product. With such filters, a milk enrichment in concentrated powder of protein and/or cream would bring drawbacks. Conventional stirring in the tank also leads to a high viscosity loss.

It is not possible to obtain new textures or to use new ingredients with the known devices and to achieve a quality product, in viable conditions technically and economically.

Experimental Data:

Factors and Levels

The dynamic device includes only one rotor-stator generator with 3 rings and a fixed gap between rotor and stator rings, of 0.5 mm. These parameters (1 generator, 3 rings stator and 3 rings rotor) were optimised on the first part of study.

On the second part, two different models of equipment were used (z66 & z 120), in order to define the device size depending on the flow rate (the first important factor).

Three factors are essential: the flow rate (Q), the peripheral velocity (V) which depends on the rotational speed of the rotor head, and the ring slot width ($W_s$) to obtain a high quality product, i.e. a high-texture, smooth and grainless product.

Measurements

Dynamic viscosity measurements were conducted with the rheometer Rheolab MCI (Physica) at day 1 (D1) and day 15 (D15). Experiments were performed at 10° C. The imposed shear rate was 64 $s^{-1}$. Data at 10 s were recorded.

The smoothing operation in the rotor-stator system is a double stirring process with two main components of the velocity field: the peripheral velocity (flow between rotor-stator gap) and the radial component (flow in the ring slots).

The best results for the quality product are reached by using a low rotational speed (corresponding to a peripheral velocity up to 16 m/s) in all cases having a high-viscosity (>300 mPas), e.g. stirred fermented milk or fresh cheese.

Each product requires a different velocity value, and the responses in terms of quality (viscosity) are different depending on the product.

The results on smoothing five different white masses with the help of the same rotor-stator mixing device show that:

1) FF Formula

The peripheral velocity is the most influent parameter. Its relative weight on the viscosity response is so important that all other factors are negligible.

To reach high-texture products, the peripheral velocity has to be adjusted according to the flow rate.

In these conditions, to reach a target viscosity of 1100 mPas, the peripheral velocity must be less than 12 m/s.

The ring slot width is the second most important factor. It has a positive effect on viscosity. An optimum is reached at 1 mm due to a high quadratic effect.

The flow rate has a low impact on viscosity, but the model definition depending on it, is also very important.

2) MF Formula

The peripheral velocity is always the parameter that must be adjusted first to achieve the highest textured fermented milk with the highest creamy and cosmetic perception. As for FF formula (without fat), the peripheral velocity has a negative impact on texture.

In addition, there is a high interaction between flow rate and ring slot width. The ring slot width is more important as the flow rate is high. Finally, at high flow rate, the slot width should be the highest in order to obtain products with high viscosity at D1.

The flow rate has low impact on viscosity response compared to the other factors.

The model (depending on the flow rate) and the slot width are established to minimized the radial shearing that would affect viscosity in a negative way. Once the equipment is defined, the final viscosity of the product is determined by the peripheral speed.

3) FFS Formula

All the factors have an impact on the viscosity response at D1, i.e. the flow rate, the peripheral velocity, the slot width, their interactions and quadratic effects. The optimum in viscosity response depends on the ratio between the two main components of the velocity that characterise the fluid flow (peripheral and radial velocities), and so the corresponding components of the shear rates and associated fluid particle resident times.

As the flow rate increases and/or the slot width decreases, the corresponding shear rates increase and so the viscosity decreases, all factors being equal in other respects.

The peripheral velocity has a negative impact on texture properties as long as its level is higher than that of radial velocity.

For a low radial velocity (FIG. 3a), i.e. low flow rate and high slot width, the increase of the peripheral velocity allows to lower the texture of stirred fermented milk (diminution of viscosity).

On the other hand, for a high radial velocity (FIG. 3b), the increase of the peripheral velocity allows to raise the texture (increase of viscosity) of stirred fermented milk until V=11 m/s.

4) HFC Formula or Fresh Cheese Formula

With a dynamic system, as for a static one, the fat and the protein contents have a positive impact on the product texture, the protein being the most important factor for texture improvement.

Subject to either a static or a dynamic smoothing, the overall behaviour of each formula depends on its microstructure, i.e. the protein network cohesion. The flow in an in-line rotor-stator mixing device mainly depends on the initial viscosity of the white mass and also on the microstructure of the white mass.

As shown in Table 2 below, a surprising texture improvement can be made by increasing the velocity of the rotor head for some formulae (see also FIGS. 3a and 3b).

TABLE 2

Impact of the increase of the rotational rotor speed on the fermented milk texture

| Fat (%) | Protein (%) | Rotational speed (rpm) | VISCO D1 (mPas) |
|---|---|---|---|
| 9.57 | 4.35 | 2142 | 1745 |
|  |  | 4182 | 3713 |
| 0.09 | 3.19 | 2142 | 485 |
|  |  | 2730 | 712 |
| 6.73 | 5.4 | 2142 | 2790 |
|  |  | 4017 | 2903 |
| 4.83 | 4.32 | 2142 | 834 |
|  |  | 3858 | 1091 |
| 2.34 | 5.42 | 2142 | 1321 |
|  |  | 4097 | 534 |
| 7.43 | 3.06 | 2142 | 1566 |
|  |  | 3011 | 980 |
|  |  | 4507 | 604 |

For both low (i.e. Fat<5.2% and Protein<3.7%) and high textured product (i.e. Fat>4.8% and Protein>5.2%), the viscosity at D1 obtained with an in-line rotor-stator mixing device is higher than that obtained with a prior art disk filter. For these fermented milk formula, dynamic smoothing is less destructive for the texture.

From these results, one can conclude that the fluid flow into the rotor-stator head highly depends on the initial viscosity of the product. For low viscous fluid (FF formula), the flow would mainly take place in the rotor-stator gap. As a result, the peripheral velocity and so the corresponding components of the shear rates have a high impact on the final product texture. The imbalance between the flow into the rotor-stator gap and into the ring slot width is more important as the peripheral velocity (i.e. the rotational speed of the rotor head), is high in view of the radial velocity (i.e. the flow rate). Moreover, this imbalance allows to smooth the product well and remove its grains. It means that there is a mean shear rate threshold allowing to optimise the product aspect (smoothness, grains quantity).

The higher the viscosity of the fluid, the more laminar the fluid flow leading to reduce the imbalance between both flows. The "product sensitivity" to the radial velocity (i.e. flow rate) will be more important. As a result, the influent factors on texture loss are the flow rate and the slot width (FFS formula).

The new smoothing technology is a suitable solution for reaching smooth products whatever the fat and the protein content, and possibly for removing grains, which results in a smoother and more creamy perception.

The inline rotor-stator mixing device is a highly flexible equipment allowing to enhance the product texture compared to a static filter by adjusting the rotational speed of the rotor, the other on line parameters have been set (device model depending on the flow rate and slot width).

It is possible to adjust the viscosity of fermented milk or yoghurt masses by a rotor-stator system, simply by fixing a particular peripheral speed which is obtained by adjusting the rotational speed of the mixer.

The dimensions of the equipment depend, as shown above on the product and on the target value of viscosity, generally implying a low loss of viscosity.

Low rotation speeds (less than 16 m/s) are used for stirred fermented milk, e.g. stirred yoghurt, or fresh cheese.

High rotation speed (more than 22 m/s) are used for drinking fermented milk, e.g. drinking yoghurt.

The invention claimed is:

1. A process for the manufacture of a fermented milk comprising, a fermentation step during which a fermented milk is submitted to a mixing step in a fermentation tank, said mixing step being made with a given stirring velocity, a smoothing step performed by adding the fermented milk into a rotor stator mixer, the rotor stator mixer comprising a ring shaped rotor head having rings, and a ring shaped stator head having rings, with each of the rotor rings and the stator rings having slots of a given width (W) between teeth thereof and wherein a radial gap (G) between the stator rings and the rotor rings is between 0.5 mm and 2 mm, said process comprising adjusting the rotational speed of the rotor to adjust the peripheral velocity to obtain a stirring velocity higher than the stirring velocity of the mixing step.

2. A process as in claim 1, wherein the stator head has three rings and the rotor head has three rings.

3. A process as in claim 1, wherein the product is a stirred fermented milk or a fresh cheese and wherein the rotor is operated so that the peripheral velocity is between 3.5 m/s and 16 m/s.

4. A process as in claim 3, wherein the fermented milk has a flow rate of less than 20,000 l/h and wherein said peripheral velocity is between 3.8 m/s and 16 m/s.

5. A process as in claim 3, wherein the fermented milk has a flow rate of between 20,000 l/h and 60,000 l/h and wherein said peripheral velocity is between 5.5 m/s and 11.4 m/s.

6. A process as in claim 5, wherein after smoothing, the viscosity is between 300 mPas and 3,700 mPas.

7. A process as in claim 1, wherein the product is a drinking fermented milk and wherein said peripheral velocity is between 22 m/s and 30 m/s.

8. A process as in claim 7, wherein the fermented milk has a flow rate is less than 20,000 l/h.

9. A process as in claim 7, wherein the fermented milk has a flow rate of between 20,000 l/h and 60,000 l/h and wherein said peripheral velocity is between 25 and 30 m/s.

10. A process as in claim 7, wherein after smoothing the viscosity is between 30 mPas and 300 mPas.

11. A process as in claim 1, wherein the slot width (W) is between 0.3 mm and 2 mm.

12. A process as in claim 11, wherein the slot width (W) is between 0.5 mm and 1.8 mm.

13. A process as in claim 1, wherein said fermented milk is a fat free-formula having a fat content at least less than 0.5% in weight.

14. A process as in claim 1, wherein said fermented milk is a medium fat formula having a fat content between 3% and 5% in weight.

15. A process as in claim 1, wherein said fermented milk is a high fat content formula having a fat content between 7.5% and 10% in weight.

16. A process as in claim 1, wherein said fermented milk is a fat free formula with an addition of starch between 1.5% and 3% in weight and wherein said slot width (W) is between 1 mm and 2 mm.

17. A process as in claim 1, wherein said fermented milk is a fat free formula with an addition of starch between 1.5% and 3% in weight and wherein the process comprises, said slot width (W) between 0.3 mm and 0.8 mm, adjusting the peripheral velocity up to 11 m/s.

18. A process as in claim 1, wherein said fermented milk is a fresh cheese formula, wherein the slot width (W) is between 1 mm and 1.5 mm.

19. A process as in claim 1, wherein said fermented milk is a stirred or drinking fermented milk.

20. A process as in claim 1, wherein said fermented milk is a fresh cheese.

21. A process as in claim 1, wherein the radial gap (G) between the stator rings and the rotor rings is equal to 0.5 mm.

22. A process according to claim 1, wherein the peripheral velocity is the velocity of a flow in the gap between the rotor and the stator having a peripheral, and having radial velocity component being a flow along the slots.

* * * * *